US011988115B2

(12) United States Patent
Nasini et al.

(10) Patent No.: US 11,988,115 B2
(45) Date of Patent: May 21, 2024

(54) SYSTEM FOR RECOVERING WASTE HEAT AND METHOD THEREOF

(71) Applicant: NUOVO PIGNONE TECNOLOGIE S.R.L., Florence (IT)

(72) Inventors: Ernesto Nasini, Florence (IT); Marco Santini, Florence (IT); Francesco Bellantone, Florence (IT); Francesco Chiesi, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 0 days.

(21) Appl. No.: 17/253,402

(22) PCT Filed: Jun. 10, 2019

(86) PCT No.: PCT/EP2019/025175
§ 371 (c)(1),
(2) Date: Dec. 17, 2020

(87) PCT Pub. No.: WO2019/238268
PCT Pub. Date: Dec. 19, 2019

(65) Prior Publication Data
US 2021/0363900 A1 Nov. 25, 2021

(30) Foreign Application Priority Data
Jun. 11, 2018 (IT) .................. 102018000006187

(51) Int. Cl.
*F01K 25/10* (2006.01)
*F01K 7/36* (2006.01)
*F02C 1/10* (2006.01)

(52) U.S. Cl.
CPC .............. *F01K 25/103* (2013.01); *F01K 7/36* (2013.01); *F02C 1/105* (2013.01)

(58) Field of Classification Search
CPC ........... F01K 25/103; F01K 7/36; F02C 1/105
USPC ........................................... 60/650, 682–684
See application file for complete search history.

(56) References Cited

U.S. PATENT DOCUMENTS

| | | | | |
|---|---|---|---|---|
| 3,441,393 | A * | 4/1969 | Multhaup | ............... C01B 3/586 423/359 |
| 4,218,891 | A * | 8/1980 | Schwartzman | ........... F25B 1/00 62/500 |
| 5,327,745 | A | 7/1994 | Gilmour | |
| 7,637,457 | B2 * | 12/2009 | Bennett | ................... F01K 15/02 244/59 |
| 9,869,272 | B1 | 1/2018 | Stuart et al. | |
| 2002/0112479 | A1 * | 8/2002 | Keefer | .................... F02B 43/10 60/651 |

(Continued)

*Primary Examiner* — Hoang M Nguyen
(74) *Attorney, Agent, or Firm* — Paul Frank + Collins P.C.

(57) ABSTRACT

A waste heat recovery system, based on a Brayton cycle, comprises a heater configured to circulate carbon dioxide vapor in heat exchange relationship with a hot fluid to heat the carbon dioxide vapor. An expander is coupled to the heater and configured to expand the carbon dioxide vapor. A compressor is configured to compress the carbon dioxide vapor fed through a cooler and a heat exchanger is adapted to circulate the carbon dioxide vapor from the expander to the cooler in heat exchange relationship with the carbon dioxide vapor from the compressor to the heater, wherein the expander and the compressor are mechanically coupled volumetric machines.

14 Claims, 7 Drawing Sheets

(56) References Cited

U.S. PATENT DOCUMENTS

| | | | |
|---|---|---|---|
| 2007/0280400 A1* | 12/2007 | Keller | F01K 23/16 376/317 |
| 2008/0121755 A1 | 5/2008 | Bennett | |
| 2010/0024476 A1* | 2/2010 | Shah | B01D 53/261 62/617 |
| 2010/0287934 A1 | 11/2010 | Glynn | |
| 2012/0039701 A1* | 2/2012 | Diddi | F02C 1/10 415/1 |
| 2012/0174585 A1 | 7/2012 | Salvin et al. | |
| 2014/0083098 A1 | 3/2014 | Davidson et al. | |
| 2014/0084595 A1* | 3/2014 | Davidson | H02J 4/00 290/1 R |
| 2014/0150443 A1* | 6/2014 | Laing | F01K 23/10 60/774 |
| 2015/0135767 A1* | 5/2015 | Currence | F25J 3/0209 62/612 |
| 2016/0341188 A1 | 11/2016 | Tognarelli et al. | |

* cited by examiner

SYSTEM FOR RECOVERING WASTE HEAT AND METHOD THEREOF

BACKGROUND

The embodiments disclosed herein relate generally to the field of heat cycle system for recovering waste heat, and more particularly, to a compound closed-loop heat Brayton cycle system for recovering waste heat, and method thereof.

Enormous amounts of waste heat are generated by a wide variety of industrial and commercial processes and operations. Example sources of waste heat include heat from heating assemblies, steam boilers, engines, and cooling systems. The term "waste heat" encompasses any supply of residual heat given off by primary processes that are not conventionally exploited as sources of energy, including but not limited to solar energy or geothermal.

Some power generation systems provide better reliability and off-grid operation with alternative fuels such as biogas or landfill gas, with examples being gas turbines and combustion engines such as microturbines and reciprocating engines. Combustion engines may be used to generate electricity using fuels such as gasoline, natural gas, biogas, plant oil, and diesel fuel. However, atmospheric pollutants such as nitrogen oxides, carbon dioxide and particulates may be emitted.

One method to generate electricity from the waste heat of a combustion engine without increasing emissions is to apply a bottoming steam Rankine cycle. A Rankine cycle typically includes a turbo generator, an evaporator/boiler, a condenser, and a liquid pump. However, water-based steam Rankine cycles are not attractive in the aforementioned low thermal (and consequently electrical) power waste heat region due to higher cost and the requirement of a continuous supervision during the operation. Steam used as a working fluid may be optimal only for a specific range of cycle temperatures and pressures. This conventional steam Rankine bottoming cycle requires condensation at relatively low pressure, implying large low-pressure turbine and condenser volumes. Hence installation of conventional bottoming steam Rankine cycle system is disproportionately bulky, and complex considering the relatively small power and effectiveness derived from low-temperature waste heat. The low pressure of the steam condensation introduces other complexities, such as the need for special de-aeration units to remove atmospheric air that leaks into the sub-atmospheric pressure vessels from the outside.

In case of an organic Rankine cycle (ORC), i.e. a Ranking cycle employing an organic fluid, the performance is limited by several factors such as degradation and working constraints of the fluid circulating within the ORC, EHS concerns about the working fluid due to its chemical composition, and thermal transfer constraints of the working fluid, leading to systems costs increase. In fact, the necessity of adoption of thermal transfer fluid, such as diathermic oil, decreases the available enthalpy of the process and increases plant complexity and cost.

It would be desirable for low power applications (0.1÷2 MW) to have a simple system and method that effectively recovers waste heat and that is not limited by constraints of a steam working fluid circulating within a Rankine cycle system, with an unmanned operation without any requirement of supervision.

BRIEF DESCRIPTION OF THE INVENTION

In accordance with the embodiment(s) discussed herein, a waste heat recovery cycle system and related method are disclosed. The exemplary heat recovery cycle system includes a Brayton cycle system having a heater configured to circulate carbon dioxide vapor in heat exchange relationship with a hot fluid to heat carbon dioxide vapor. In accordance with an exemplary embodiment, the exemplary waste heat recovery system is integrated (directly coupled) with heat sources to allow a higher efficiency recovery of waste heat to be converted into mechanical power for electricity generation and/or mechanical application such as the driving of pumps or compressors. The heat sources may include combustion engines, gas turbines, geothermal, solar thermal, industrial and residential heat sources.

It is thus possible to obtain a system that offers:

a high efficiency & cost effective solution (small equipment due to CO2 selection as working fluid) to convert waste heat into mechanical energy, thanks to the possibility to directly couple (with higher temperature difference and consequently higher efficiency) the working fluid with the heat source, which is not possible to do with ORC, due to working fluid features such as degradation and EHS concerns;

a safe & environmental friendly solution (CO2 has not EHS concerns); a wide operating rangeability due to the fact that the cycle foresees one phase fluid only and so it is not affected by environmental conditions since there is no need to reach condensed phase in all ambient conditions as instead it is required in a waste heat recovery Rankine cycle with two phase fluid.

a solution wherein no condensation is required, so that at high ambient temperature is still suitable for cooling, a major benefit, due to a lower size of coolers, compared to other Rankine cycles.

Another advantage of not having a condenser is related to the system assembly arrangement because neither restriction and constraints are required, nor special auxiliaries such as hot well, pipe drain slope, low NPSH pumps, etc.

Further benefits connected to the present disclosure are the possibility of building Plug&Play skidded plants, with minimum field activities (commissioning and site test); the possibility to exploit waste heat sources for electric production and/or mechanical drive application in small-scale applications with size up to 10 MW with all the environmental requirements met, and the lack of water as boiling fluid, that requires operator attendance.

BRIEF DESCRIPTION OF THE DRAWINGS

The present disclosure will become more apparent from the following description of exemplary embodiments to be considered in conjunction with accompanying drawings wherein.

DETAILED DESCRIPTION

According to first exemplary embodiments, a waste heat recovery system based on a Brayton cycle, comprises a heater configured to circulate carbon dioxide vapor in heat exchange relationship with a hot fluid to heat the carbon dioxide vapor; an expander is coupled to the heater and configured to expand the carbon dioxide vapor; a compressor is configured to compress the carbon dioxide vapor fed through a cooler and a heat exchanger is adapted to circulate the carbon dioxide vapor from the expander to the cooler in heat exchange relationship with the carbon dioxide vapor from the compressor to the heater, wherein the expander and the compressor are mechanically coupled volumetric machines, such as, for example, reciprocating machines, radial expanders/compressors, axial expanders/compressors, screw expanders/compressors, impulse expanders/compressors or combination thereof.

To increase the efficiency of the system, in an embodiment the compressor is a multi-stage compressor comprising a plurality of serially arranged compressor stages, wherein respective inter-stages heat exchangers are arranged between pairs of sequentially arranged compressor stages, wherein the inter-stage heat exchangers are configured to remove heat from compressed carbon dioxide vapor circulating from consecutive compressor stages.

A further embodiment relates to a method comprising circulating carbon dioxide vapor in heat exchange relationship with a hot fluid to heat the carbon dioxide vapor via a heater of a Brayton cycle system. The carbon dioxide vapor is then first expanded via an expander coupled to the heater of the Brayton cycle system and then cooled down via a cooler. The carbon dioxide vapor is then sent to a compressor of the Brayton cycle system to be compressed and then it is circulated from the compressor to the heater in heat exchange relationship with the carbon dioxide vapor from the expander so as to pre-heat the carbon dioxide vapor.

Figure 1:
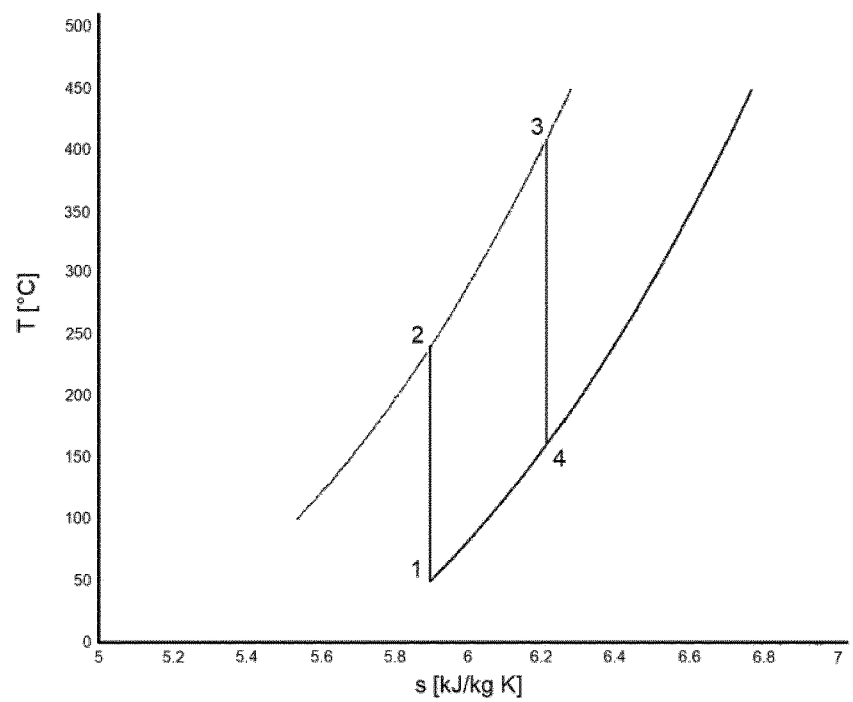
FIG. 1 illustrates the T-S diagram of an ideal Brayton cycle.

An ideal Brayton cycle comprises two isentropic and two isobaric processes as shown in the T-S diagram depicted in FIG. 1. The isobaric processes relate to heating and cooling of the process fluid, while the isoentropic processes relate to the expansion and compression of the process fluid.

Figure 2:
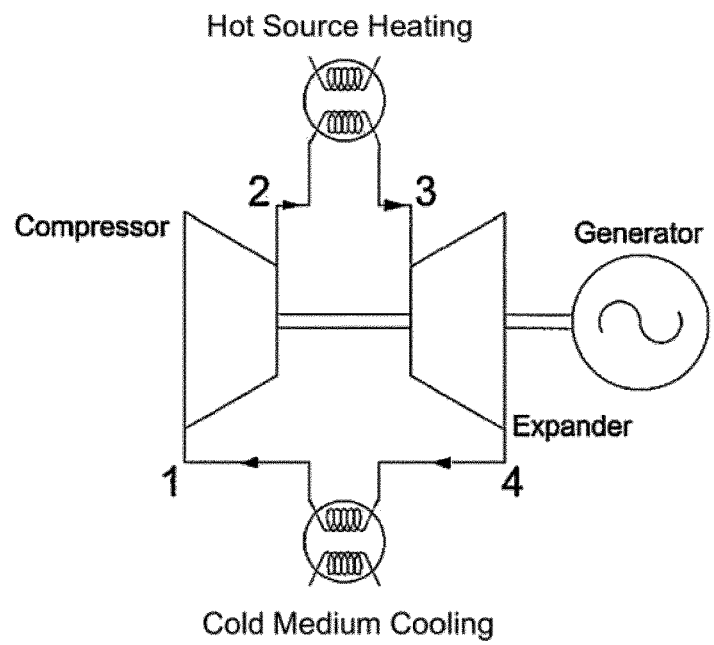
FIG. 2 illustrates a Brayton engine.

With reference to FIG. 2 showing an exemplified Brayton engine, the process fluid is isoentropically compressed by a compressor from point 1 to point 2 using compressing power Lc, isobarically heated from point 2 to point 3 by a heater providing heat Qin, isoentropically expanded by an expander from point 3 to 4 producing expansion power Le, isobarically cooled from point 4 to 1 by a cooler exchanging heat Qout.

As compressor and expander are mechanically coupled, the net power the machinery is able to produce is Ln=Le−Lc. The efficiency q is the ratio between net power Ln and heat Qin and can be shown to be:

$$\eta = 1 - \frac{T_1}{T_2} = 1 - \beta^{-\varphi}$$

where $T_1$ and $T_2$ are, respectively, the temperature before and after compression, $\beta$ is the compression ratio $p_2/p_1=p_3/p_4$, $\varphi=1-1/k$ with k being the ratio between the specific heat of the process fluid at constant pressure $C_p$ and constant volume $C_v$.

The net power Ln can be expressed as a function of $\beta$ and $T_1$, $T_3$ as follows:

$$Ln = (1 - \beta^{-\varphi})C_p T_1 \left(\frac{T_3}{T_1} - \beta^{\varphi}\right)$$

Differentiating, it can be shown that the maximum net power is obtained when $T_2=T_4=\sqrt{T_3 T_1}$.

The inventors found that carbon dioxide as processing fluid, as compared with other gases like $N_2$, He, Ne, Ar, Xe, has a very good net power/compression power ratio Ln/Lc (0.716), but poor efficiency q (0.28). For example, Nitrogen has an ideal efficiency of 0.37, but poor Ln/Lc (0.343). Helium has an even greater ideal efficiency (0.47), but very poor Ln/Lc (0.109). It means that, to produce 1 MW of net power, 1.4 MW of compression power is required (in ideal condition) with $CO_2$ against 2.9 MW for Nitrogen and 9.2 MW for Helium.

Shifting from ideal to real world, compression work increases and expansion work decrease thus, for low values of Ln/Lc, the net power could become a very low percentage of compression work, or even negative. Hence the choice of carbon dioxide as a processing fluid in embodiments herein, preferably using arrangements capable of increasing efficiency.

The usage of carbon dioxide as the working fluid has furthermore the advantage of being non-flammable, non-corrosive, non-toxic, and able to withstand high cycle temperatures (for example above 400 degrees Celsius). Carbon dioxide may also be heated super critically to high temperatures without risk of chemical decomposition.

As efficiency is the ratio between net power and heat exchanged by the processing fluid with the hot source, in one arrangement, efficiency is increased by reducing such heat by pre-heating the carbon dioxide delivered by the compressor before reaching the heater. This can be advantageously achieved by using part of the heat present in the fluid exiting the expander, i.e. by using a so-called Regenerator as it will be explained below.

In another arrangement, the efficiency is increased by reducing the compression power using inter-stage cooling.

Figure 3:
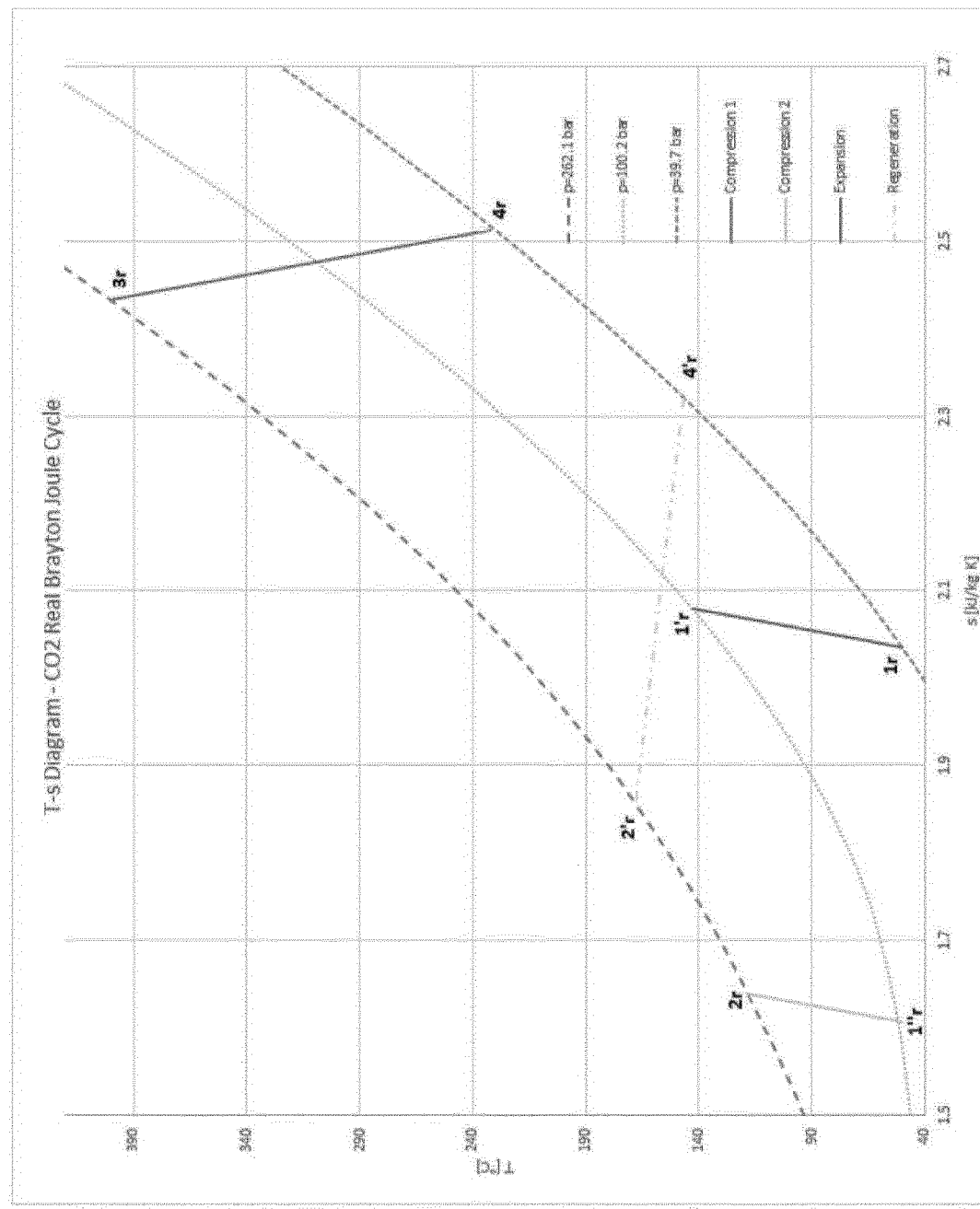
FIG. 3 illustrates schematically a modified real Brayton cycle according to embodiments herein.

The effect of the combination of the two arrangements, that can obviously exist independently one from the other, is shown in the T-S diagram of FIG. 3.

Regeneration is reflected on the horizontal dotted line from point 4'r to point 2'r, while inter-stage compressor cooling is represented by mid isobar from point 1'r to 1"r. Here a real cycle is depicted where the isoentropic curves of FIG. 1 are replaced with oblique (polytropic) curves to take into account that, in real expansion and compression, some heat is always exchanged.

Figure 4:
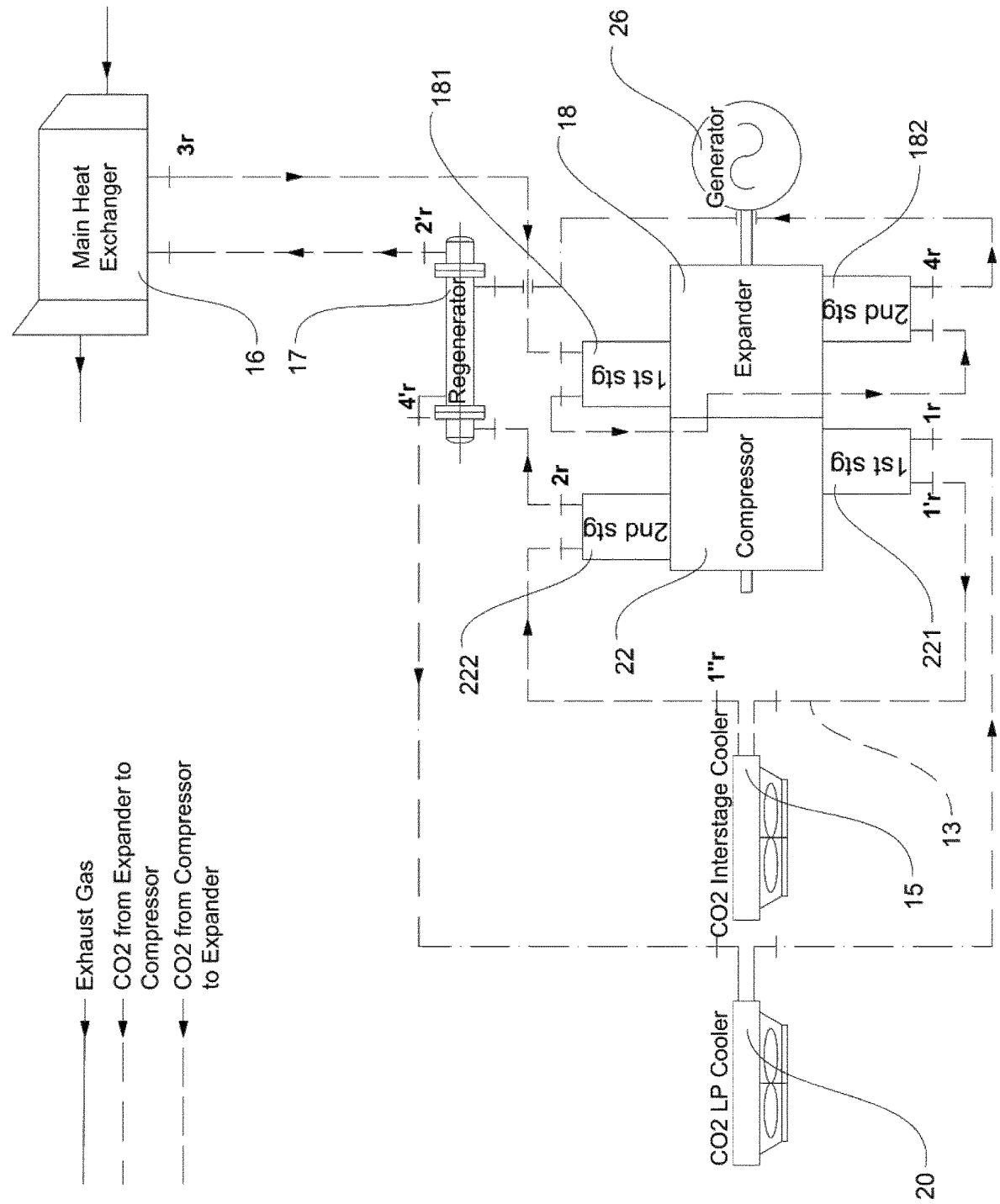
FIG. 4 illustrates a first schematic of a system for recovering waste heat according to embodiments herein.

Referring to FIG. 4, a waste heat recovery system is illustrated in accordance with an exemplary embodiment.

The heater 16 is coupled to a heat source, for example an exhaust unit of a heat generation system (for example, an engine). In operation, the heater 16 receives heat from a hot fluid e.g. an exhaust gas generated from the heat source, which warms the carbon dioxide vapor passing through a pipe coupled with the heater. In one specific embodiment, the carbon dioxide vapor exiting from the heater 16 may be at a first temperature of about 410 degrees Celsius and at a first pressure of about 260 bar. Leaving the heater, the hot carbon dioxide vapor flows to and thorough the expander 18 to expand the carbon dioxide vapor. As the pressurized, hot carbon dioxide vapor expands, it turns a shaft that is configured to drive a first generator 26, which generates electric power. With expanding, carbon dioxide vapor also cools and depressurizes as it expands. Accordingly, in a specific embodiment, the carbon dioxide vapor may exit the expander 18 at a second, lower temperature of about 230 degrees Celsius and a second, lower pressure of about 40 bar.

Pausing to consider the structure of the expander, we see that in one embodiment, the expander has a plurality of serially arranged expander stages. Each expander stage may have, or be formed of, one or more expanders, such as reciprocating expanders. In other embodiments, each expander stage can include a single volumetric expander. By way of illustration and not limitation, an embodiment shown in FIG. 4 comprises two serially arranged expander stages labeled 181, 182, in which expander stages 181, 182, has one expander each.

Continuing our description of an operation cycle of the new system, we now follow the cooled, depressurized carbon dioxide, still at the second temperature and pressure, as it flows from the single expander 18 or last expander 182 into and through a low pressure, LP, cooler 20. The LP cooler 20 is configured to further super cool the carbon dioxide vapor down to a third temperature (lower than the first temperature or second temperature, alone or combined) of about 40-50° C. The carbon dioxide vapor exits the LP cooler 20 and flow into and through a compressor 22, which operates to compress and heat the carbon dioxide vapor to a substantially higher fourth temperature and to a fourth pressure. In passing, we note the fourth pressure may be about the same or equal to the first pressure described above. Thus, by way of example only, in one embodiment, the now, twice heated carbon dioxide vapor that exits from the compressor 22 is at a fourth temperature of about 110° C. and a fourth pressure of about 260 bar.

The compressor 22 will now be further described. In one embodiment, the compressor 22 may be a multi-stage compressor with an intercooler disposed between each stage of the multi-stage compressor. The system may comprise a plurality of serially arranged compressor stages, each compressor stage comprising, one or more reciprocating compressors. In some embodiments, each compressor stage can include a single reciprocating compressor. The embodiment shown in FIG. 4 comprises two serially arranged compressor stages labeled 221, 222, each comprising one compressor.

In the diagrammatic representation of FIG. 4, the two compressor stages 221, 222 are paired. Each pair of oppositely arranged compressor stages is driven by a common shaft. In an embodiment, a gearbox connects the various shafts to the expander 18. Other configurations are of course possible.

Resuming our tour of an operating cycle of the system, we return to where the carbon dioxide vapor enters the first compressor stage 221 at 1r (at the third pressure and third temperature explained above) and exits said first compressor stage 221 at 1'r. A flow path 13 may extend from the exit side of compressor stage 221 to the entry side of compressor stage 222. Along the flow path 13 an inter-stage heat exchanger or cooler 15 is provided. Said inter-stage cooler will be indicated here below as inter-stage heat exchanger 15. Consequently, the (now) compressed carbon dioxide vapor flowing through the fluid path 13 also flows across the inter-stage heat exchanger 15 and is cooled by a cooling fluid, for example air, which flows through a duct (not shown) into and through a separate path in the interstage heat exchanger 15. In some embodiments, air can enter the inter-stage heat exchanger 15 at around 30° C. and exit the heat exchanger 15 at around 50-60° C., meaning that the air has absorbed about 20° C.+ of heat from the compressed carbon dioxide vapor, thereby cooling (or at least reducing a temperature to which the carbon dioxide vapor would otherwise reach). These values are by way of example only and shall not be considered as limiting the scope of the subject matter disclosed herein.

The semi cooled carbon dioxide now enters the second compressor stage 222 exits said compressor stage 222 at 2r.

In an embodiment, the system comprises a heat exchanger 17, also called a regenerator, which is configured to circulate a portion of the cooled, expanded, lower pressure carbon dioxide vapor from the expander 18 to the LP cooler 20 so that a heat exchange relationship occurs with respect to the carbon dioxide vapor exiting from the compressor 22 and flowing to the heater 16 to allow a pre-heating of the carbon dioxide vapor up to 160° C. before being re-fed to the heater and starting a new cycle.

Embodiments herein also relate to a $CO_2$ Brayton engine comprising inter-stage cooling through liquid (e.g. water or mixtures thereof) injection inside the compression cylinders.

In Double acting compressor cylinder, as the piston runs, pressure rises at one end (e.g. Head End) and decreases at the opposite end. The pressure reverses at the opposite stroke, according to the formula: $P*V^n=const$. Temperature increases with pressure according to the formula $TP^{[(1-n)/n]}=const$.

Thus, limiting the temperature rise in the cylinder, and therefore limiting the corresponding increase of the specific volume and the volumetric flow rate, will reduce the compression work (proportional to the integral of PdV), increasing the overall efficiency of the cycle.

To accomplish limiting the temperature rise in the cylinder and the corresponding increase in specific volume, a spray of liquid (e.g. a mixture of water) can be injected directly in the active effect side of the cylinder in order to reduce the compression work.

The pressure of the liquid shall be higher than actual gas pressure, in order to win resistance and help nebulization, whereas the temperature of the liquid to be sprayed shall be the lowest allowed by environmental conditions. The Liquid flow rate is such that its partial pressure, once vaporized, is always below its vapor pressure corresponding to the expected gas temperature (i.e. gas temperature after the cooling), to prevent any trace of liquid droplets that could be dangerous for the cylinder components (e.g. the compressor valves). The injected liquid, after exiting from the compression cylinders, is incorporated in the mixture until it is cooled and condensed in the interstage and final cooler. Then the injected liquid is compressed by a pump and re-injected, thus working in a closed loop.

The power consumption of liquid pump is negligible compared to the overall power increase of the system.

Since liquid vapor molar fraction in the mixture with CO2 increases with mixture temperatures and decreases with mixture pressure, liquid spray injection is more effective at lower pressures and higher temperatures. Therefore, as compression stages increase, applying liquid spray injection should be carefully evaluated.

In the T-s Diagram of the system, the compression work decreases thanks to the reduced volumetric flow-rate and the increased polytropic efficiency; the whole cycle area increases, as well as the overall efficiency. The thermal duty of the inter-stage cooler is unchanged, and the lower EMTD due to the lower mixture temperature at the exchanger inlet is compensated by the increased overall heat transfer coefficient, due to the condensing H2O in the mixture.

Figure 10:
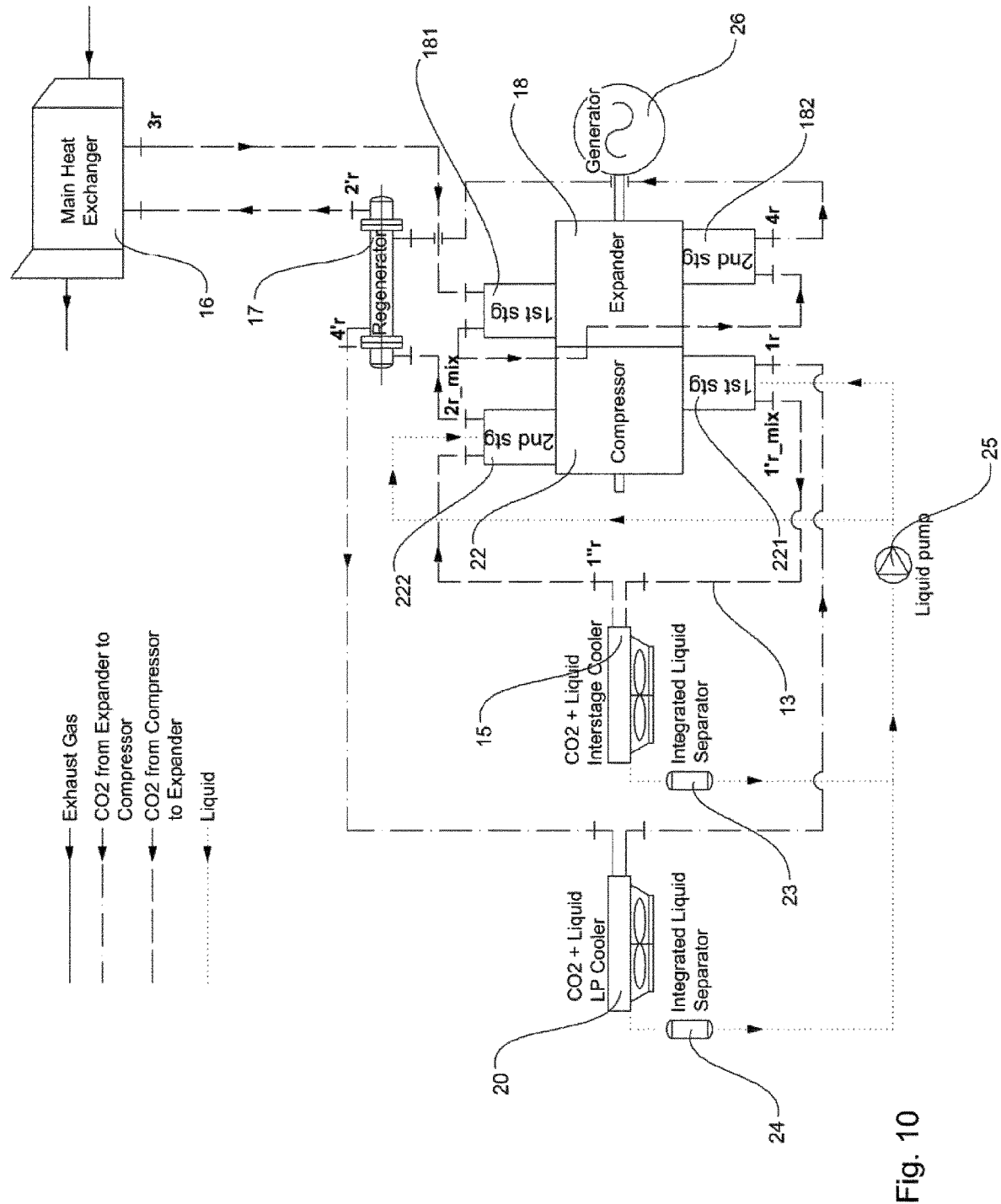
FIG. 10 illustrates a second schematic of a system for recovering waste heat according to embodiments herein.

The schematic of the above described $CO_2$ Brayton engine comprising inter-stage cooling is illustrated on FIG. 10. Integrated separator drums 23, 24 are placed downstream the inter-stage heat exchangers or coolers 15, 20 to separate and collect the condensed liquid before it is compressed in the pump 25, to be then reinjected in the compressor stages 221, 222.

The volumetric expander and the volumetric compressor forming the carbon dioxide engine can be of any known type, mechanically connected in any known way. For example they can be reciprocating machines, radial expanders/compressors, axial expanders/compressors, screw expanders/compressors, impulse expanders/compressors or combination thereof.

Figure 5:
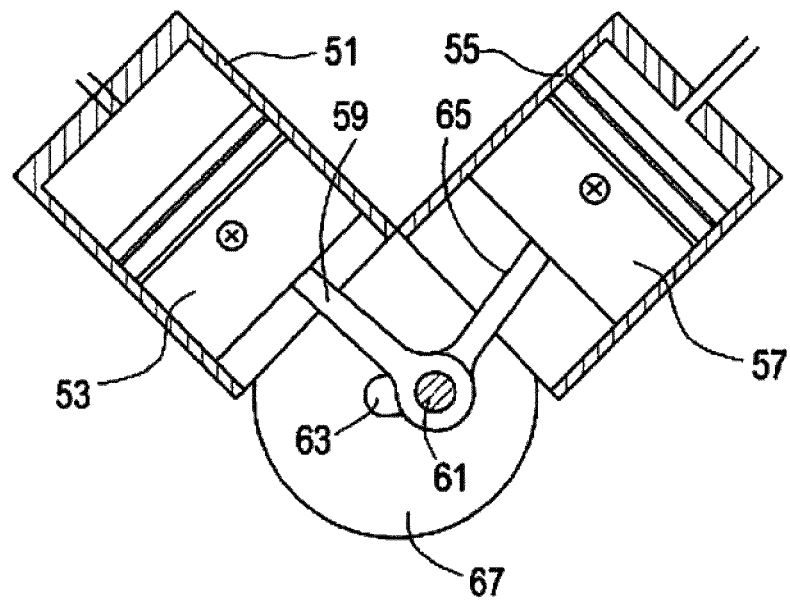
FIG. 5 illustrates an exemplary configuration of a compressor and an expander in a system according to embodiments herein.

An example is shown in FIG. 5. Here the pair compressor/expander comprises a first cylinder 51, wherein a first piston 53 is slidingly movable. A second cylinder 55 is further provided, oriented at e.g. 90° with respect to the cylinder 51. A second piston 57 is slidingly arranged in the second cylinder 55.

A first connecting rod 59 connects the first piston 53 to a crank pin 61 of a crankshaft, forming part of an output shaft 63. The crankshaft is preferably rotatingly supported in a frame. A second connecting rod 65 connects the second piston 57 to the same output 63. A flywheel 67 can be mounted on the output shaft 63. The expander and the compressor are thus mechanically coupled volumetric machines drivingly connected to at least one of said crank pins, such that power generated by the Brayton engine drives at least one compression cylinder-piston arrangement.

The power available on the output shaft 63 can be used to drive an electric generator or any other machinery, for example, a compression train as disclosed in WO 2015/113951A1 to be herein considered incorporated by reference.

Embodiments herein also relate to a $CO_2$ Brayton engine comprising a heater 16 which, in operation, is configured to circulate and heat up the carbon dioxide vapor through thermal exchange with a hot fluid; the carbon dioxide vapor is fed to an expander 18 coupled to the heater 16 and configured to cool down and lower the pressure of the carbon dioxide vapor, before being fed first to a heat exchanger 17, then to a LP cooler 20 and then to a compressor 22 adapted to increase pressure and temperature of the carbon dioxide vapor fed through the cooler. The heat exchanger 17, also called a regenerator, is configured to circulate and to make a pre-cooling of the carbon dioxide vapor from the expander to the LP cooler 20 in heat exchange relationship with the carbon dioxide vapor from the compressor to the main heat exchanger 16, to allow a pre-heating of the carbon dioxide vapor up to 160° C. before being re-fed to the main heat exchanger 16 and starting a new cycle. The expander and the compressor are mechanically coupled volumetric machines drivingly connected to at least one of said crank pins, such that the power generated by said Brayton engine drives at least one compression cylinder-piston arrangement connected to a crank pin.

Figure 9:
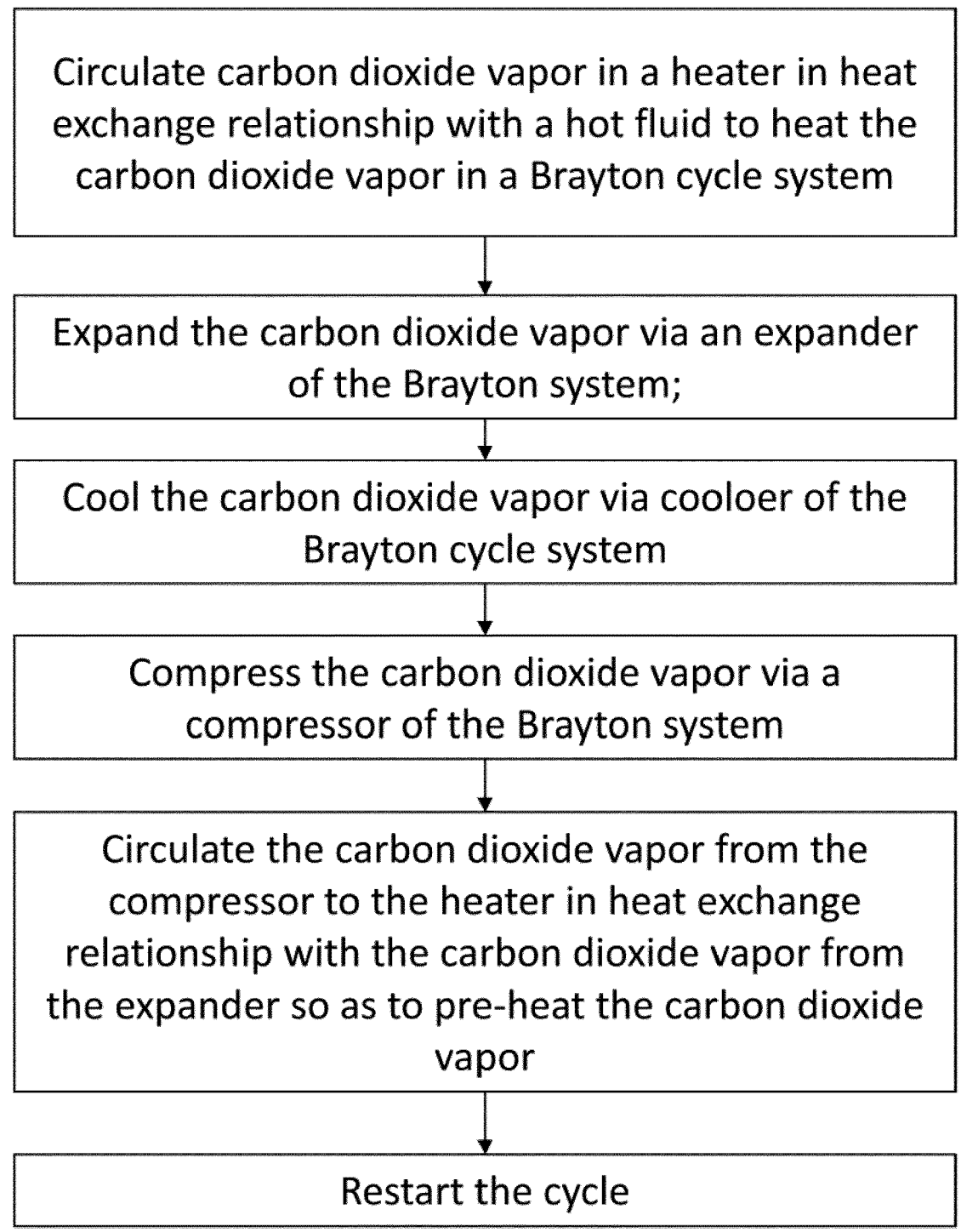
FIG. 9 is a flowchart illustrating the operations of a method according to embodiments herein.

Embodiments also relate to a method for operating a Brayton engine. With reference to the flowchart of FIG. 9, the operations of the method include a step of circulating carbon dioxide vapor through a heater of a Brayton cycle system wherein a thermal exchange takes place between a hot fluid and the carbon dioxide vapor; then a following step of expanding the carbon dioxide vapor via an expander coupled to the heater of the Brayton cycle system, for example from 260 bar±10% to 40 bar±15% in a temperature range between 400° C.±15% and 230° C.±15%; then a further step of cooling the carbon dioxide vapor from the expander via a cooler of the Brayton cycle system; then a further step of compressing the carbon dioxide vapor fed through the cooler via a compressor of the Brayton cycle system. Such compression step is typically chosen to bring the carbon dioxide vapor from a pressure of 40 bar±10% to 260 bar±15% in a temperature range between 50° C.±15% and 110° C.±15%. A final step is then taken for circulating the carbon dioxide vapor from the compressor to the heater in heat exchange relationship with the carbon dioxide vapor from the expander so as to pre-heat the carbon dioxide vapor, for example, from 110° C.±15% to 160° C.±15%.

In an embodiment, the compressing step is performed through the compression of carbon dioxide vapor circulating in consecutive compressor stages after an inter-stage cooling in order to reduce compression power and thus increase efficiency.

Circulating carbon dioxide vapor in heat exchange relationship with a hot fluid may advantageously comprise heating carbon dioxide vapor with waste heat sources including, for example, combustion engines, gas turbines, geothermal, solar thermal, industrial and residential heat sources, or the like. Waste heat sources may heat the carbon dioxide either directly or through an auxiliary fluid.

Alternatively, circulating carbon dioxide vapor in heat exchange relationship with a hot fluid may comprise heating carbon dioxide vapor with a burner. This allows to realize a very compact and powerful carbon dioxide engine to be used for various applications, such as, for example, for compressing a fluid in a fuel distributor.

Figure 7:
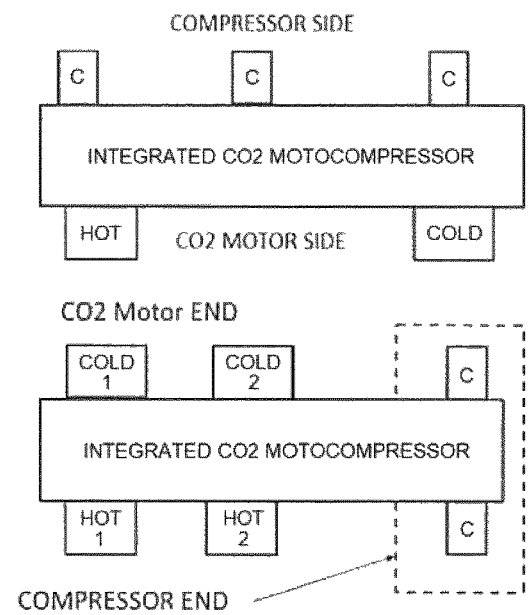
FIG. 7 illustrates two configurations of a motor compressor driven by a $CO_2$ engine according to embodiments herein.
Figure 8:
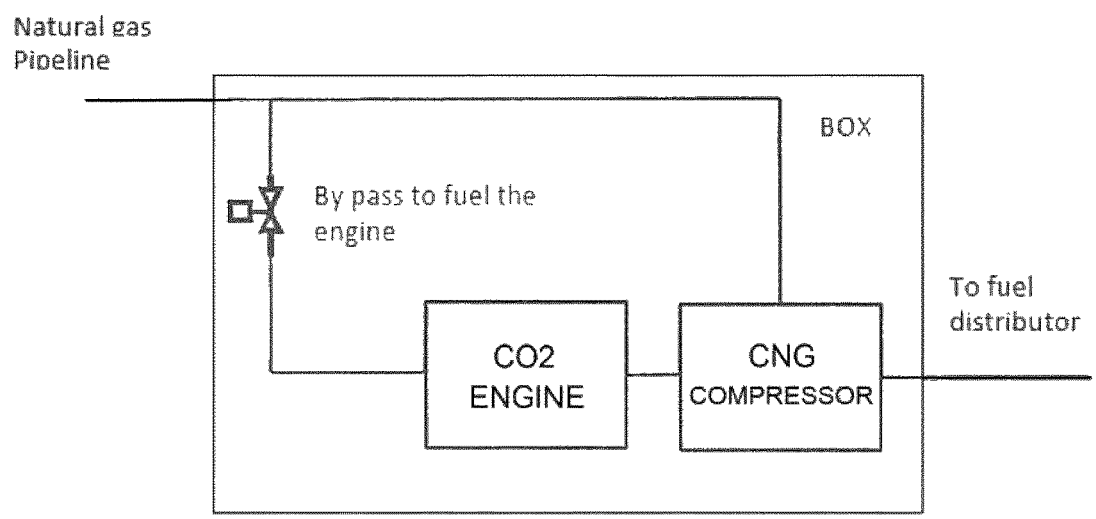
FIG. 8 illustrates a block diagram of a system to be used for fuel distribution.

The teaching of the present disclosure can find several applications. An example is in fuel distribution as shown in FIG. 8 where the $CO_2$ engine is used to drive a CNG compressor. Here the heater is a combustor fed by the natural gas of the pipeline. The system is very compact and can be easily packaged in a box in various configurations as, for example, shown in FIG. 7.

Figure 6:
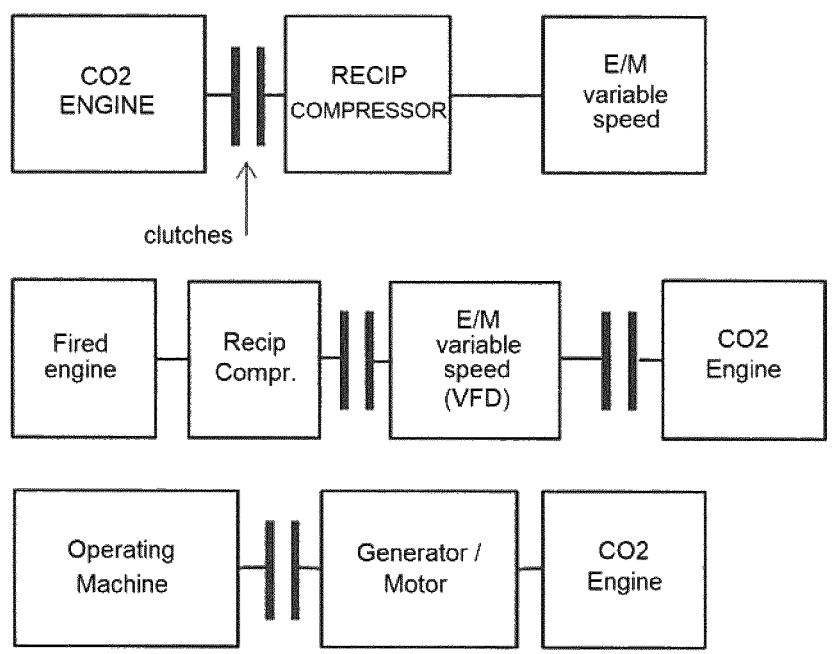
FIG. 6 illustrates exemplary configurations of trains including one or more clutches.

FIG. 6 shows other possible configurations of trains including one or more clutches as disclosed, for example, in US 2016/0341187A1, US 2016/0341188, US 2016/0348661 to be considered part of the present disclosure.

Embodiments of the invention may reside in the clauses as set forth below or any combination thereof.

While only certain features of the disclosed embodiment have been illustrated and described herein, many modifications and changes will occur to those skilled in the art. It is, therefore, to be understood that the appended claims are intended to cover all such modifications and changes as fall within the true spirit of the disclosure.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. The description of exemplary embodiments refer to the accompanying drawings. The same reference numbers in different drawings identify the same or similar elements. The present detailed description does not limit the invention. Instead, the scope of the invention is defined by the appended claims.

The invention claimed is:

1. A waste heat recovery system, comprising:
a Brayton cycle system comprising:
  a waste heat source configured to produce a hot fluid, wherein a fuel source is not combusted to generate the hot fluid;
  a heater in fluid communication with the waste heat source, the heater configured to circulate carbon dioxide vapor in heat exchange relationship with the hot fluid produced by the waste heat source to heat the carbon dioxide vapor;
  an expander coupled to the heater and configured to expand the carbon dioxide vapor;
  a first heat exchanger coupled to the expander;
  a cooler coupled to the first heat exchanger, the cooler comprising a second heat exchanger and a third heat exchanger, wherein the first heat exchanger delivers carbon dioxide vapor to the third heat exchanger of the cooler, which cools the carbon dioxide vapor to a first temperature;
  a compressor having a first stage and a second stage coupled to the second heat exchanger, the first stage being configured to compress the carbon dioxide vapor,
  wherein the second heat exchanger receives the compressed carbon dioxide from the first stage of the compressor and delivers the compressed carbon dioxide to the second stage of the compressor at a second temperature that is lower than the first temperature,
  wherein the first heat exchanger is configured to circulate the carbon dioxide vapor from the expander to the third heat exchanger in heat exchange relationship with the carbon dioxide vapor from the compressor to the heater, and
  wherein the expander and the compressor are mechanically coupled volumetric machines.

2. The system according to claim 1, wherein the volumetric machines are selected from the group consisting of: reciprocating machines, radial expanders/compressors, axial expanders/compressors, screw expanders/compressors, impulse expanders/compressors or combination thereof.

3. The system according to claim 1, wherein the second heat exchanger is liquid cooled.

4. The system according to claim 3, comprising separator drums placed downstream the second heat exchanger and adapted to separate and collect condensed cooling liquid; a pump adapted to compress the cooling liquid from the separator drums and inject the compressed liquid in the first stage and the second stage of the compressor.

5. The system according to claim 4, wherein the liquid is water or a water-based mixture.

6. The system according to claim 1, wherein the compressor and the expander are configured to work between the isobars 40 bar±10% and 260 bar±15% in a temperature range between 50° C.±15% and 410° C.±15% of the Brayton cycle.

7. The system according to claim 1, wherein the compressor and the expander are configured to work in a range of entropies between 1.5 kJ/kgK±15% and 2.5 kJ/kgK±15%.

8. The system according claim 1, wherein the waste heat source is a geothermal source, a solar thermal source, or combinations thereof.

9. The system according to claim 1, wherein the expander is mechanically coupled with an operating machine, with or without clutches, to collect the generated power.

10. A reciprocating compressor system, comprising:
a frame;
a crankshaft rotatingly supported in said frame and comprised of a plurality of crank pins;
at least one compression cylinder-piston arrangement, comprised of a compression cylinder and a compression piston reciprocating therein and drivingly connected to a respective one of said crank pins; and
a $CO_2$ Brayton engine comprising:
  a waste heat source configured to produce a hot fluid, wherein a fuel source is not combusted to generate the hot fluid;
  a heater in fluid communication with the waste heat source, the heater configured to circulate carbon dioxide vapor in heat exchange relationship with the hot fluid produced by the waste heat source to heat the carbon dioxide vapor;
  an expander coupled to the heater and configured to expand the carbon dioxide vapor;
  a first heat exchanger coupled to the expander;
  a cooler coupled to the first heat exchanger, the cooler comprising a second heat exchanger and a third heat exchanger, wherein the first heat exchanger delivers carbon dioxide vapor to third heat exchanger of the cooler, which cools the carbon dioxide vapor to a first temperature;
  a compressor having a first stage and a second stage coupled to the second heat exchanger, the first stage being configured to compress the carbon dioxide vapor from the third heat exchanger,
  wherein the second heat exchanger receives the compressed carbon dioxide from the first stage of the compressor and delivers the compressed carbon dioxide to the second stage of the compressor at a second temperature that is lower than the first temperature,
  wherein the first heat exchanger is configured to circulate the carbon dioxide vapor from the expander to the third heat exchanger in heat exchange relationship with the carbon dioxide vapor from the compressor to the heater, and
  wherein the expander and the compressor are mechanically coupled volumetric machines drivingly connected to at least one of said crank pins, such that power generated by said Brayton engine drives said at least one compression cylinder-piston arrangement.

11. A method, comprising:
producing a hot fluid via a waste heat source, wherein a fuel source is not combusted to generate the hot fluid;
circulating carbon dioxide vapor in heat exchange relationship with the hot fluid produced by the waste heat source to heat the carbon dioxide vapor via a heater of a Brayton cycle system, the heater in fluid communication with the waste heat source;
expanding the carbon dioxide vapor via an expander coupled to the heater of the Brayton cycle system;
circulating a portion of the carbon dioxide vapor from the expander through a first heat exchanger and delivering the portion to a cooler having a second heat exchanger and a third heat exchanger;
at the third heat exchanger, cooling the carbon dioxide vapor from the expander to a first temperature;
compressing the carbon dioxide vapor from the third heat exchanger via a first stage of a compressor of the Brayton cycle system;
circulating the carbon dioxide vapor from the first stage of the compressor to the second heat exchanger of the cooler, wherein the second heat exchanger cools the carbon dioxide vapor to a second temperature that is less than the first temperature;

compressing the carbon dioxide vapor from the second heat exchanger at a second stage of the compressor; and circulating the carbon dioxide vapor from the second stage of the compressor to the first heat exchanger, which pre-heats the carbon dioxide vapor prior to the heater.

12. The method according to claim 11, wherein the compressing step comprises compressing the carbon dioxide vapor from 40 bar±15% to 260 bar±15% in a temperature range between 50° C.±15% and 110° C.±15%.

13. The method according to claim 11, wherein expanding comprises expanding the carbon dioxide vapor from 260 bar±10% to 40 bar±15% in a temperature range between 400° C.±15% and 230° C.±15%.

14. The method according claim 11, wherein preheating comprises heating the carbon dioxide vapor from 110° C.±15% to 160° C.±15%.

* * * * *